United States Patent
Tang et al.

(10) Patent No.: US 12,253,615 B2
(45) Date of Patent: Mar. 18, 2025

(54) BEACON MAP CONSTRUCTION METHOD, DEVICE, AND COMPUTER-READABLE STORAGE MEDIUM

(71) Applicant: UBTECH ROBOTICS CORP LTD, Shenzhen (CN)

(72) Inventors: Yu Tang, Shenzhen (CN); Mingqiang Huang, Shenzhen (CN); Dunhao Liu, Shenzhen (CN); Tiecheng Sun, Shenzhen (CN); Jichao Jiao, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 352 days.

(21) Appl. No.: 18/088,755

(22) Filed: Dec. 26, 2022

(65) Prior Publication Data
US 2023/0288526 A1    Sep. 14, 2023

(30) Foreign Application Priority Data
Mar. 14, 2022 (CN) .................. 202210249133.7

(51) Int. Cl.
G01S 5/02 (2010.01)

(52) U.S. Cl.
CPC ........ G01S 5/02525 (2020.05); G01S 5/0244 (2020.05)

(58) Field of Classification Search
CPC .......................... G01S 5/02525; G01S 5/0244
USPC .......................................................... 342/451
See application file for complete search history.

(56) References Cited

U.S. PATENT DOCUMENTS

2022/0108613 A1* 4/2022 Estep .................. G05D 1/0289

FOREIGN PATENT DOCUMENTS

| EP | 3995988 A1 * | 5/2022 | ........... G01C 21/206 |
| WO | WO-2019226045 A1 * | 11/2019 | ........... B64C 39/024 |

OTHER PUBLICATIONS

"Research on AGV Autonomous Positioning Technology Based on Lidar and View Width"; Sun Peng; Chinese Master's Theses Full-text Database Information Science and Technology; Issue 01, 2021; p. I136-1091; Jan. 15, 2021.
"Construction and Optimization of Mobile Robot Map Based on Laser SLAM"; Hu Mingchao; Chinese Master's Theses Full-text Database Information Science and Technology; Issue 02. 2020; p. I140-732; Feb. 15, 2020.

* cited by examiner

*Primary Examiner* — Harry K Liu (57) ABSTRACT

A beacon map construction method, a device, and a computer-readable storage medium are provided. In the method, obtaining measured positions of beacons at the (i−1)-th station point by a measuring equipment; obtaining a first pose constraint relationship of the measuring equipment at the i-th station point relative to the (i−1)-th station point; obtaining a second pose constraint relationship of the i-th station point relative to beacons at the i-th station point, based on a pose of each of the beacons at the i-th station point, and the positions of the beacons at the (i−1)-th station point; determining an error equation of the i-th station point based on the first pose constraint relationship and the second pose constraint relationship; and optimizing the error equation to determine a position of the i-th station point, and constructing a beacon map based on the determined position of the i-th station point.

20 Claims, 6 Drawing Sheets

BEACON MAP CONSTRUCTION METHOD, DEVICE, AND COMPUTER-READABLE STORAGE MEDIUM

CROSS REFERENCE TO RELATED APPLICATIONS

The present disclosure claims priority to Chinese Patent Application No. 202210249133.7, filed Mar. 14, 2022, which is hereby incorporated by reference herein as if set forth in its entirety.

BACKGROUND

1. Technical Field

The present disclosure relates to robot technology, and particularly to a beacon map construction method, a device, and a computer-readable storage medium.

2. Description of Related Art

With the development of robot technology, the requirements for the accuracy of the positioning and the navigation of robots are also increased accordingly. To improve the positioning accuracy of robots, the use of artificial beacons is getting common. For example, beacons such as UWB tags, reflectors, or QR codes can be set in the working scene of a robot, thereby positioning the robot in real time with high accuracy according to the pre-determined position of the beacons.

The position of the beacons needs to be determined before positioning the robot using the beacons, because the accuracy of the positions of the beacons will directly affect the accuracy of the positioning of the robot. The positions of the beacons within the visible range can be measured using a high-precision measuring equipment such as a total station, thereby building maps. However, although the total station has high measurement accuracy, a large error will be generated when switching stations. Especially in large scenes, due to the accumulation of errors caused by station switching, the error of the beacon map will be eventually large, which is not conducive to improving the accuracy of the positioning and the navigation of the robot.

BRIEF DESCRIPTION OF THE DRAWINGS

To describe the technical schemes in this embodiment or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

When navigating a robot using beacons, the positions of the beacons need to be determined first, because the accuracy of the positions of the beacons will directly affect the accuracy of the navigation of the robot. Therefore, when constructing a beacon map, it is necessary to improve the accuracy of the determined positions of the beacon as much as possible.

In the existing beacon map construction method, a high-precision measuring equipment such as a total station is usually used to detect the beacons to determine the positions of the beacons on the map. For the convenience of description, a total station is used as an example of the measuring equipment for description below.

Figure 1:
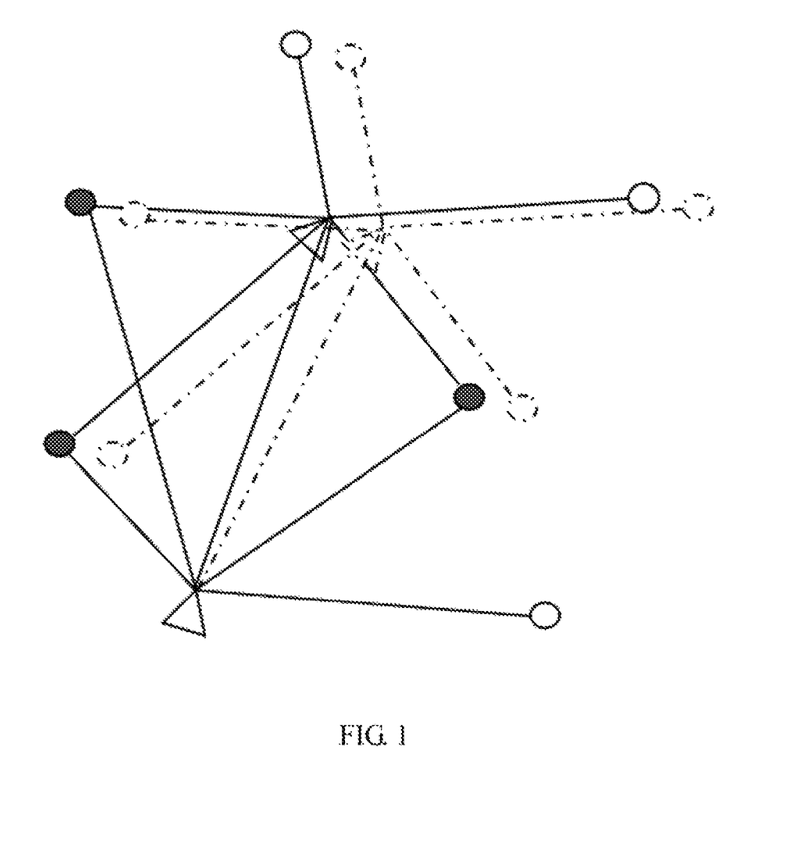
FIG. 1 is a schematic diagram of an existing beacon map construction method according to the prior art.

FIG. 1 is a schematic diagram of an existing beacon map construction method according to the prior art. As shown in FIG. 1, for example, the triangle in the figure is the position of the total station, that is, the station point, and the circle is the position of the beacon. Assuming that the station point in the lower left is the station point with accurate positioning (for example, the station point may be the initial station point by which the coordinate system is established), when performing station switching on the total station, the actual position moved to is as shown by the triangle in the upper right while the calculated position may be at the position of the dashed triangle in the upper right. Due to the deviation between the calculated position of the total station and its real position, the positions of the beacons calculated and detected by the total station at the station point will also be deviated, thereby affecting the accuracy of the beacon map constructed by the beacons. In addition, as the errors of the station points accumulates, for example, when the position of the station point is further determined based on the station point in the upper right, the errors of the stations point will further increase. Therefore, this method is not conducive to ensuring the accuracy of the constructed beacon map, and will affect the accuracy of the navigation and the positioning of the robot.

Figure 2:
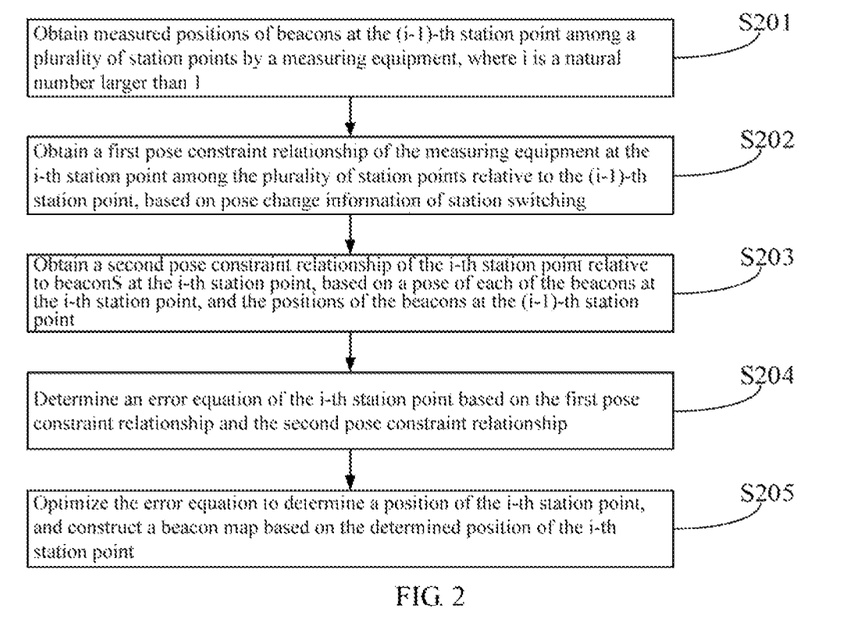
FIG. 2 is a flow chart of a beacon map construction method according to an embodiment of the present disclosure.

FIG. 2 is a flow chart of a beacon map construction method according to an embodiment of the present disclosure. In order to solve the forgoing problem, a beacon map construction method is provided. In this embodiment, the method is a computer-implemented method executable for (a processor of) an electronic device (e.g., a robot, a computer, and a mobile phone), for example, a beacon map construction apparatus shown in FIG. 5, or a beacon map construction device 6 shown in FIG. 6. As shown in FIG. 2, the method may include the following steps.

S201: obtaining measured positions of beacons at the (i−1)-th station point among a plurality of station points by a measuring equipment, where i is a natural number larger than 1.

In this embodiment, the measuring equipment may be a high-precision measuring equipment such as a total station. The electronic device may communicate with the measuring equipment through a communication unit (e.g., a network interface controller which connects to a network such as Wi-Fi or Bluetooth). By setting the measuring equipment at the position of the station point, the measuring equipment can detect the beacons within the field of view of the station point, and obtain the pose (i.e., the position and the posture) of the beacon relative to the station point that includes the distance of the beacon relative to the station point and the orientation of the beacon relative to the station point.

In this embodiment, the beacons may include one or more of ultra-wideband (UWB) tags, reflectors, and two-dimensional codes. In other embodiments, it may also include beacons with other specific patterns. By setting the beacons in the scene where the robot is located and determining the positions of the beacons, the robot can determine the real-time position of the robot based on the relative positional relationship between the detected beacon and the robot during the navigation of the robot.

For example, the construction of a beacon map may be realized in advance through beacon mapping, while the accuracy of the positions of the beacons in the constructed beacon map meets the requirement of the positioning accuracy of the robot. If the robot detects beacons at the current position, for example, three beacons are detected, the coordinate of the robot can be accurately determined based on the coordinates of the beacons that are combined with the distance between the robot and the beacons. Alternatively, if the beacon has orientation information, the position of the robot can be determined based on the positions and relative directions of the two beacons that are detected by the robot.

In this embodiment, when determining the positions of the beacons, the positions of the station points that can detect the beacon is determined first. For example, at the initial station point, a coordinate system may be established based on the initial station point to determine the coordinate of the initial station point. Based on the coordinate of the determined station point that is combined with the pose relationship between the beacons detected at the station point and the station point itself, the position or the pose of the beacon can be determined In this embodiment, when the positions of the beacons that are measured at the (i−1)-th station point by the measuring equipment is taken, the position of the (i−1)-th station point has been determined in advance, while the accuracy of the position of the (i−1)-th station point meets to a preset positioning precision requirement. Since the measuring equipment is a high-precision measuring equipment, the accuracy of the positions of the beacons detected through the (i−1)-th station point should also be able to meet the preset positioning accuracy requirement.

In this embodiment, the (i−1)-th station point may be the initial station point, or be any station point before the terminal station point, that is, the method can gradually determine the accurate position of each station point by means of iterative calculation.

In this embodiment, if the beacon does not have pose information and the measuring equipment cannot determine the measured pose, the beacons and the station points in the working scene of the robot may be determined in advance, then the position of the initial station point may be determined according to the number of the beacons that can be detected by each station point and the number of the common beacons that can be simultaneously detected by two adjacent station points.

Figure 3:
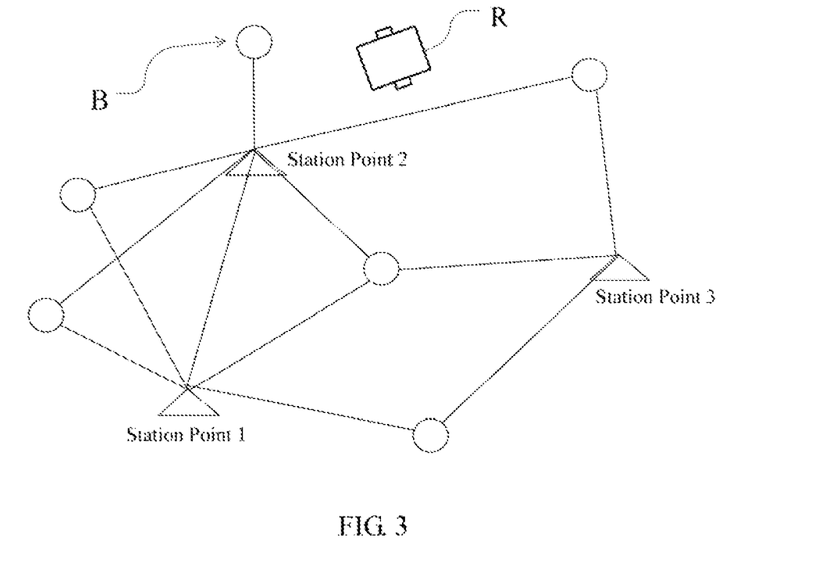
FIG. 3 is a schematic diagram of determining the starting station point according to an embodiment of the present disclosure.

FIG. 3 is a schematic diagram of determining the starting station point according to an embodiment of the present disclosure. As shown in FIG. 3, a robot R executing the above-mentioned beacon map construction method communicates with station points (the triangles in the figure). As an example, in the positional relationship between beacons B (the circles in the figure) and the station points, station point 1 can detect 4 beacons B, station point 2 can detect 5 beacons B, and station point 3 can detect 3 beacons B; and the number of the common beacons B that can be detected by station point 1 and station point 2 is three, and the number of the common beacons B that can be detected by station point 2 and station point 3 is two. Therefore, any one of station point 1 and station point 2 that has the number of the common beacons B larger than 3 may be selected as the starting station point. When station point 1 is used as the starting station point, the direction of the second station point is used as the switching direction; otherwise, when station point 2 is used as the starting station point, the direction of the first station point is used as the switching direction.

After the starting station point is determined, station switching may be performed according to the determined switching direction, and the number of the detected (i.e., positioned) beacons that can be detected by each station point may be determined according to the beacons detected by the station point. If the number is less than 3, it may not be possible to accurately position the station point, and it may update the position of the beacon, add new beacon, or update the position of the station point, so that the number of the detected beacons that can be detected by the station point meets the positioning requirement. For example, the position of the station point may be updated to change the station points for detecting the station point so that the number of the beacons that can be detected by the station points is equal to or larger than 3.

For example, as shown in FIG. 3, with station point 1 as the starting station point, before the position of station point 3 is determined the positions of the beacons that can be detected by station point 1 and station point 2 have been positioned through the measuring equipment. Among the beacons detected by station point 3, since there is one beacon in common with station point 1 and two beacons in common with station point 2, the number of the detected beacons among the beacons detected by station point 3 is 3, and it is not necessary to update or add the beacon or the station point.

For example, when the beacon has a direction identification, for example, the beacon is a two-dimensional code with a direction identification, or the measuring equipment can determine the measured pose at the station point. Since the position of the station point can be accurately determined using the beacons with the direction identification or the measuring equipment that can determine the measured pose that are combined with the positional relationship between the beacons and the station point, the required number of the common beacons for two adjacent station points may be set to be larger than or equal to 1. If the requirement is met, any one of the two adjacent station points may be used as the starting station point, while the other of the two adjacent station points may be used as the switching direction.

Likewise, when the beacon has the direction identification, the number of the positioned beacons that can be detected by any station point will be larger than or equal to 1. If the requirement is met, the positioning requirement for the station point can be achieved according to the positioned beacons.

S202: obtaining a first pose constraint relationship of the measuring equipment at the i-th station point among the plurality of station points relative to the (i−1)-th station point, based on pose change information (i.e., the information of the change of the pose when switching stations) of station switching.

When obtaining the first pose constraint relationship of the i-th station point relative to the (i−1)-th station point, the distance and orientation relationship between the i-th station point and the (i−1)-th station point can be measured at the (i−1)-th station point to determine the first pose constraint relationship between the i-th station point and the (i−1)-th station point.

Alternatively, it may also measure the distance and orientation relationship between the i-th station point and the (i−1)-th station point at the i-th station point, so as to obtain the first pose constraint relationship between the i-th station point and the (i−1)-th station point.

Alternatively, it may also measure the distance between the i-th station point and the (i−1)-th station point at the (i−1)-th station point, and measure the orientation relationship between the i-th station point and the (i−1)-th station point at the i-th station point, so as to obtain the first pose constraint relationship between the i-th station point and the (i−1)-th station point.

When determining the first pose constraint matrix of the i-th station point after station switching relative to the i-th station point before station switching, the pose $xs_i=[p_i, q_i]^T$ of the i-th station point relative to the previous station point, that is, the (i−1)-th station point may be obtained, where $p_i=[x,y,z]^T$, q is the quaternion of posture, and $q_i=[x,y,z,w]^T$. Then, the relative pose constraint of the station point is $e(xs_{i-1}, xs_i)=xs_i$, where x, y, and z are the coordinate of the station point, and w is the weight. In which, T refers to the transpose of a matrix.

S203: obtaining a second pose constraint relationship of the i-th station point relative to beacons collected by the measuring equipment at the i-th station point, based on a pose of each of the beacons collected by the measuring equipment at the i-th station point, and the positions of the beacons collected by the measuring equipment at the (i−1)-th station point.

When performing beacon detection at the i-th station point by the measuring equipment, one or more beacons can be detected to determine the relative pose relationship between the i-th station point and the beacons. If the beacons each have a posture identifier, the second pose constraint relationship between the beacons and the station point may be determined, according to the measured postures of the beacons and the distances between the station point and the beacons. Alternatively, if the measuring equipment can determine its corresponding pose when measuring the beacons, the second pose constraint relationship between the station point and the beacons may also be determined according to the posture of the measuring equipment when measuring the distances between the station point and the beacons.

Alternatively, if the beacon has no posture identification and the measuring equipment cannot determine the measured posture, the pose relationship between the station point and the beacons may be determined based on the distances between three or more beacons and the station point, so as to generate the second pose constraint relationship between each beacon and the station point.

Assuming that the i-th station point is Si, the pose is $xs_i=[p_i, q_i]^T$, and the positions of k beacons measured by the measuring equipment is $x1_j$ $[x,y,z]^T$, then the second pose constraint relationship may be expressed as an equation of:

$$e(xs_i, x1_j)=x1_j;$$

where, j is the number of the beacon, and the value of j is [1, k].

S204: determining an error equation of the i-th station point based on the first pose constraint relationship and the second pose constraint relationship.

When determining the error equation of the i-th station point based on the first pose constraint relationship and the second pose constraint relationship, the first information matrix corresponding to the first pose constraint relationship and the second information matrix corresponding to the second pose constraint relationship may be respectively determined first. In which, the first information matrix and the second information matrix may be covariance matrices.

Since there is a station switching in the first pose constraint relationship, there may be a large station switching error through the station switching. Therefore, the first information matrix may be set to a relatively large value. However, the accuracy of the beacons measured at the station point by the high-precision measurement equipment is very high, hence the relative pose error between the beacons is small, and the corresponding second pose constraint relationship may be set to a relatively small value.

For example, the first information matrix may be set as a covariance matrix $$\Omega_{sx} = \begin{bmatrix} 9\times 10^{-4} & 0 & 0 \\ 0 & 9\times 10^{-4} & 0 \\ 0 & 0 & 9\times 10^{-4} \end{bmatrix}$$

that is relatively larger than the second information matrix, and the second information matrix may be set as a covariance matrix $$\Omega_{si} = \begin{bmatrix} 4\times 10^{-6} & 0 & 0 \\ 0 & 4\times 10^{-6} & 0 \\ 0 & 0 & 4\times 10^{-6} \end{bmatrix}$$

that is relatively smaller than the first information matrix.

Based on the first pose constraint relationship and the second pose constraint relationship that are combined with the respectively corresponding first information matrix and second information matrix, the error equation corresponding to the i-th station point may be determined. The error equation may be expressed as an equation of:

$$e = \sum_{i=1}^{n} e(xs_{i-1}, xs_i)^T \Omega_{sx} e(xs_{i-1}, xs_i) + \sum_{i=0}^{n}\sum_{j=0}^{n_i} e(xs_i, xl_j)^T \Omega_{si} e(xs_i, xl_j);$$

where, $e(xs_{i-1}, xs_i)$ represents the first pose constraint relationship, $e(xs_i, x1_j)$ represents the second pose constraint relationship, n is the number of the station points in the scene, and $n_i$ is the number of the beacons detected at the i-th station point.

That is to say, the i-th station point and any detected positioned beacon can constitute the constraint relationship of the i-th node, which constrains the position of the i-th station point.

S205: optimizing the error equation to determine a position of the i-th station point, and constructing a beacon map based on the determined position of the i-th station point.

Figure 4:
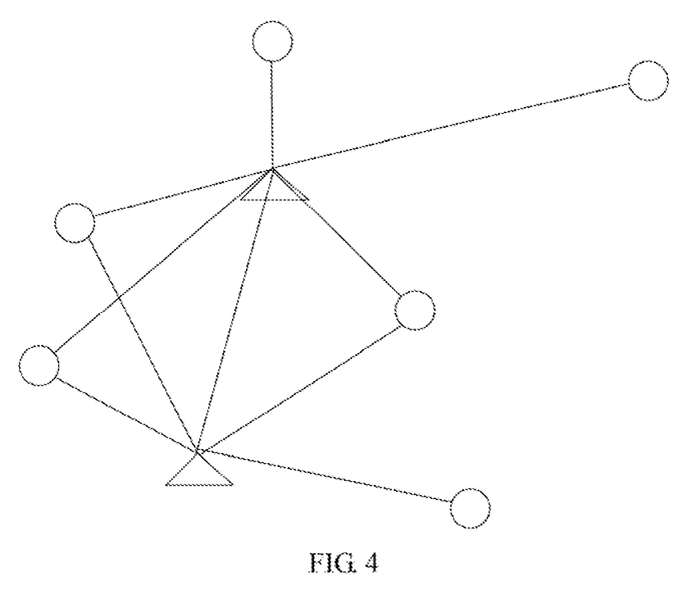
FIG. 4 is a schematic diagram of graph optimization according to an embodiment of the present disclosure.

FIG. 4 is a schematic diagram of graph optimization according to an embodiment of the present disclosure. As shown in FIG. 4, based on the determined error equation, a graph optimization relationship graph may be constructed through a graph optimization algorithm by using the station point (the triangle in the figure) and each beacon (the circle in the figure) as optimization nodes and the relative pose of the beacons and that of the station point as edges. Based on the graph optimization algorithm, the parameters corresponding to the minimum error can be determined, that is, the position of the i-th station point corresponding to the minimum error can be determined. The graph optimization algorithm may include, but is not limited to, g2o and the like.

After the position of the i-th station point is determined through an algorithm such as the graph optimization algorithm, the position of the unpositioned beacon in the beacons detected by the i-th station point may be determined based on the pose relationship of the beacons relative to the station point that is measured at the i-th station point by the measuring equipment.

After the position of the i-th station point and that of the beacon detected at the i-th station point are determined, based on the same solving method, the position of the i+1-th station point and that of the beacon detected at the i+1-th station point may be determined. The forgoing process may be repeated until the last station point and the position of the beacon detected by that station point are solved. In this manner, the position of the new station point is optimized using the positions of the beacons and that of the previous station point, which can effectively reduce the accumulation of the errors of the station points, thereby effectively improving the accuracy of station point positioning so as to obtain the beacon map with higher accuracy.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 5:
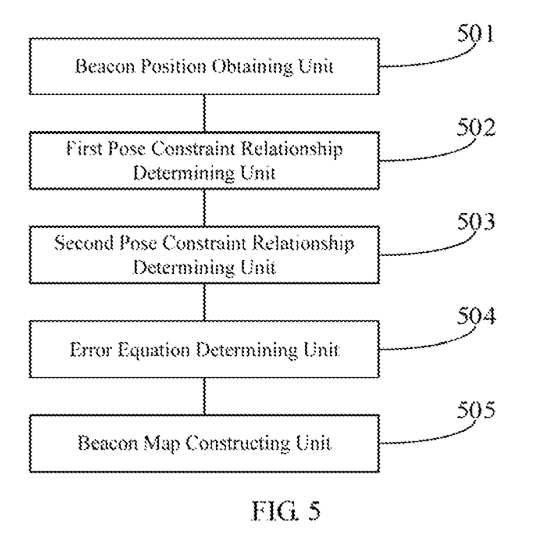
FIG. 5 is a schematic block diagram of a beacon map construction apparatus according to an embodiment of the present disclosure.

FIG. 5 is a schematic block diagram of a beacon map construction apparatus according to an embodiment of the present disclosure. As shown in FIG. 5, a beacon map construction apparatus (e.g., a robot) is provided. The apparatus may include:

a beacon position obtaining unit 501 configured to obtain measured positions of beacons at the (i−1)-th station point among a plurality of station points by a measuring equipment, where i is a natural number larger than 1;

a first pose constraint relationship determining unit 502 configured to obtain a first pose constraint relationship of the measuring equipment at the i-th station point among the plurality of station points relative to the (i−1)-th station point based on pose change information of station switching;

a second pose constraint relationship determining unit 503 configured to obtain a second pose constraint relationship of the i-th station point relative to beacons collected by the measuring equipment at the i-th station point, based on a pose of each of the beacons collected by the measuring equipment at the i-th station point, and the positions of the beacons collected by the measuring equipment at the (i−1)-th station point;

an error equation determining unit 504 configured to determine an error equation of the i-th station point based on the first pose constraint relationship and the second pose constraint relationship; and a beacon map constructing unit 505 configured to optimize the error equation to determine a position of the i-th station point, and constructing a beacon map based on the determined position of the i-th station point.

The beacon map construction apparatus shown in FIG. 5 corresponds to the beacon map construction method shown in FIG. 2.

Figure 6:
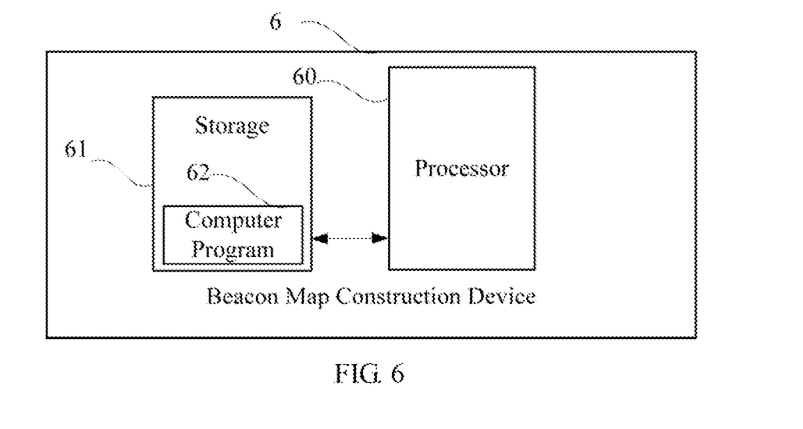
FIG. 6 is a schematic block diagram of a beacon map construction device according to an embodiment of the present disclosure.

FIG. 6 is a schematic block diagram of a beacon map construction device according to an embodiment of the present disclosure. As shown in FIG. 6, in this embodiment, A beacon map construction device 6 (e.g., a robot) may include a processor 60, a storage 61, and a computer program 62 stored in the storage 61 and executable on the processor 60, for example, a beacon map construction program. When executing (instructions in) the computer program 62, the processor 60 implements the steps in the above-mentioned embodiments of the beacon map construction method. Alternatively, when the processor 60 executes the (instructions in) computer program 62, the functions of each module/unit in the above-mentioned device embodiments are implemented.

Exemplarily, the computer program 62 may be divided into one or more modules/units, and the one or more modules/units are stored in the storage 61 and executed by the processor 60 to realize the present disclosure. The one or more modules/units may be a series of computer program instruction sections capable of performing a specific function, and the instruction sections are for describing the execution process of the computer program 62 in the beacon map construction device 6.

The beacon map construction device 6 may include, but is not limited to, the processor 60 and the storage 61. It can be understood by those skilled in the art that FIG. 6 is merely an example of the beacon map construction device 6 and does not constitute a limitation on the beacon map construction device 6, and may include more or fewer components than those shown in the figure, or a combination of some components or different components. For example, the beacon map construction device 6 may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the beacon map construction device 6, for example, a hard disk or a memory of the beacon map construction device 6. The storage 61 may also be an external storage device of the beacon map construction device 6, for example, a plug-in hard disk, a smart media card (SMC), a secure digital (SD) card, flash card, and the like, which is equipped on the beacon map construction device 6. Furthermore, the storage 61 may further include both an internal storage unit and an external storage device, of the beacon map construction device 6. The storage 61 is configured to store the computer program 62 and other programs and data required by the beacon map construction device 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented beacon map construction method, comprising:
    obtaining measured positions of beacons at the (i−1)-th station point among a plurality of station points by a measuring equipment, wherein i is a natural number larger than 1;
    obtaining a first pose constraint relationship of the measuring equipment at the i-th station point among the plurality of station points relative to the (i−1)-th station point based on pose change information of station switching;
    obtaining a second pose constraint relationship of the i-th station point relative to beacons collected by the measuring equipment at the i-th station point, based on a pose of each of the beacons collected by the measuring equipment at the i-th station point, and the positions of the beacons collected by the measuring equipment at the (i−1)-th station point;
    determining an error equation of the i-th station point based on the first pose constraint relationship and the second pose constraint relationship; and optimizing the error equation to determine a position of the i-th station point, and constructing a beacon map based on the determined position of the i-th station point.

2. The method of claim 1, wherein the determining the error equation of the i-th station point based on the first pose constraint relationship and the second pose constraint relationship comprises:
   determining a first information matrix corresponding to the first pose constraint relationship and a second information matrix corresponding to the second pose constraint relationship; and
   determining the error equation of the i-th station point based on the first pose constraint relationship and the first information matrix, and the second pose constraint relationship and the second information matrix, wherein values in the first information matrix are smaller than values in the second information matrix.

3. The method of claim 1, wherein if the beacon does not have a direction identification, before the obtaining the measured positions of the beacons at the (i−1)-th station point by the measuring equipment, the method further comprises:
   determining a number of the beacons detected by the measuring equipment at each of the plurality of station points; and
   determining one of two adjacent station points among the plurality of station points as a starting station point and the other of the two adjacent station points as a station switching direction, in response to the number of beacons simultaneously detected at the two adjacent station points being larger than 3.

4. The method of claim 3, wherein after determining the starting station point, the method further comprises:
   determining the beacons detected during station switching based on the starting station point; and
   performing one of updating the positions of the beacons and adding beacon in response to the number of the detected beacons included in the beacons detected at any of the plurality of station points being less than 3, so that the number of the positioned beacons included in the beacons detected at the station point is larger than or equal to 3.

5. The method of claim 1, wherein the obtaining the first pose constraint relationship of the measuring equipment at the i-th station point relative to the (i−1)-th station point based on pose change information of station switching comprises:
   determining the pose change information corresponding to the i-th station point and the (i−1)-th station point based on a distance and orientation relationship between the (i−1)-th station point and the i-th station point measured by the (i−1)-th station point; and
   determining the first pose constraint relationship based on the pose change information corresponding to the i-th station point and the (i−1)-th station point.

6. The method of claim 1, wherein the obtaining the second pose constraint relationship of the i-th station point relative to the beacons positioned at the i-th station point by the measuring equipment based on the pose of each of the positioned beacons collected at the i-th station point by the measuring equipment and the positions of the beacons positioned at the i-th station comprises:
   obtaining the second pose constraint relationship of the i-th station point relative to the beacons positioned at the i-th station point by the measuring equipment based on the pose of each of the positioned beacons collected at the i-th station point by the measuring equipment and the positions of the beacons whose positions are at positions of the beacons detected at the i-th station point among the beacons have been positioned before determining the position of the i-th station point.

7. The method of claim 1, wherein the optimizing the error equation to determine the position of the i-th station point comprises:
   calculating a minimum value of the error equation according to a graph optimization method, and determining the position of the i-th station point based on the minimum value of the error equation.

8. A beacon map construction device:
   a processor;
   a memory coupled to the processor; and
   one or more computer programs stored in the memory and executable on the processor;
   wherein, the one or more computer programs comprise:
   instructions for obtaining measured positions of beacons at the (i−1)-th station point among a plurality of station points by a measuring equipment, wherein i is a natural number larger than 1;
   instructions for obtaining a first pose constraint relationship of the measuring equipment at the i-th station point among the plurality of station points relative to the (i−1)-th station point based on pose change information of station switching:
   instructions for obtaining a second pose constraint relationship of the i-th station point relative to beacons collected by the measuring equipment at the i-th station point, based on a pose of each of the beacons collected by the measuring equipment at the i-th station point, and the positions of the beacons collected by the measuring equipment at the (i−1)-th station point;
   instructions for determining an error equation of the i-th station point based on the first pose constraint relationship and the second pose constraint relationship; and
   instructions for optimizing the error equation to determine a position of the i-th station point, and constructing a beacon map based on the determined position of the i-th station point.

9. The device of claim 8, wherein the instructions for determining the error equation of the i-th station point based on the first pose constraint relationship and the second pose constraint relationship comprise:
   instructions for determining a first information matrix corresponding to the first pose constraint relationship and a second information matrix corresponding to the second pose constraint relationship; and
   instructions for determining the error equation of the i-th station point based on the first pose constraint relationship and the first information matrix, and the second pose constraint relationship and the second information matrix, wherein values in the first information matrix are smaller than values in the second information matrix.

10. The device of claim 8, wherein the one or more computer programs further comprise:
    instructions for determining a number of the beacons detected by the measuring equipment at each of the plurality of station points; and
    instructions for determining one of two adjacent station points among the plurality of station points as a starting station point and the other of the two adjacent station points as a station switching direction, in response to the number of beacons simultaneously detected at the two adjacent station points being larger than 3.

11. The device of claim 10, wherein the one or more computer programs further comprise:
  instructions for determining the beacons detected during station switching based on the starting station point; and
  instructions for performing one of updating the positions of the beacons and adding beacon in response to the number of the detected beacons included in the beacons detected at any of the plurality of station points being less than 3, so that the number of the positioned beacons included in the beacons detected at the station point is larger than or equal to 3.

12. The device of claim 8, wherein the instructions for obtaining the first pose constraint relationship of the measuring equipment at the i-th station point relative to the (i−1)-th station point based on pose change information of station switching comprise:
  instructions for determining the pose change information corresponding to the i-th station point and the (i−1)-th station point based on a distance and orientation relationship between the (i−1)-th station point and the i-th station point measured by the (i−1)-th station point; and
  instructions for determining the first pose constraint relationship based on the pose change information corresponding to the i-th station point and the (i−1)-th station point.

13. The device of claim 8, wherein the instructions for obtaining the second pose constraint relationship of the i-th station point relative to the beacons positioned at the i-th station point by the measuring equipment based on the pose of each of the positioned beacons collected at the i-th station point by the measuring equipment and the positions of the beacons positioned at the i-th station comprise:
  instructions for obtaining the second pose constraint relationship of the i-th station point relative to the beacons positioned at the i-th station point by the measuring equipment based on the pose of each of the positioned beacons collected at the i-th station point by the measuring equipment and the measured positions of the beacons whose positions are at positions of the beacons detected at the i-th station point among the beacons have been positioned before determining the position of the i-th station point.

14. The device of claim 8, wherein the instructions for optimizing the error equation to determine the position of the i-th station point comprise:
  instructions for calculating a minimum value of the error equation according to a graph optimization method, and determining the position of the i-th station point based on the minimum value of the error equation.

15. A non-transitory computer-readable storage medium for storing one or more computer programs, wherein the one or more computer programs comprise:
  instructions for obtaining measured positions of beacons at the (i−1)-th station point among a plurality of station points by a measuring equipment, wherein i is a natural number larger than 1;
  instructions for obtaining a first pose constraint relationship of the measuring equipment at the i-th station point among the plurality of station points relative to the (i−1)-th station point based on pose change information of station switching;
  instructions for obtaining a second pose constraint relationship of the i-th station point relative to beacons collected by the measuring equipment at the i-th station point, based on a pose of each of the beacons collected by the measuring equipment at the i-th station point, and the positions of the beacons collected by the measuring equipment at the (i−1)-th station point;
  instructions for determining an error equation of the i-th station point based on the first pose constraint relationship and the second pose constraint relationship; and
  instructions for optimizing the error equation to determine a position of the i-th station point, and constructing a beacon map based on the determined position of the i-th station point.

16. The storage medium of claim 15, wherein the instructions for determining the error equation of the i-th station point based on the first pose constraint relationship and the second pose constraint relationship comprise:
  instructions for determining a first information matrix corresponding to the first pose constraint relationship and a second information matrix corresponding to the second pose constraint relationship; and
  instructions for determining the error equation of the i-th station point based on the first pose constraint relationship and the first information matrix, and the second pose constraint relationship and the second information matrix, wherein values in the first information matrix are smaller than values in the second information matrix.

17. The storage medium of claim 15, wherein the one or more computer programs further comprise:
  instructions for determining a number of the beacons detected by the measuring equipment at each of the plurality of station points; and
  instructions for determining one of two adjacent station points among the plurality of station points as a starting station point and the other of the two adjacent station points as a station switching direction, in response to the number of beacons simultaneously detected at the two adjacent station points being larger than 3.

18. The storage medium of claim 17, wherein the one or more computer programs further comprise:
  instructions for determining the beacons detected during station switching based on the starting station point; and
  instructions for performing one of updating the positions of the beacons and adding beacon in response to the number of the detected beacons included in the beacons detected at any of the plurality of station points being less than 3, so that the number of the positioned beacons included in the beacons detected at the station point is larger than or equal to 3.

19. The storage medium of claim 15, wherein the instructions for obtaining the first pose constraint relationship of the measuring equipment at the i-th station point relative to the (i−1)-th station point based on pose change information of station switching comprise:
  instructions for determining the pose change information corresponding to the i-th station point and the (i−1)-th station point based on a distance and orientation relationship between the (i−1)-th station point and the i-th station point measured by the (i−1)-th station point; and
  instructions for determining the first pose constraint relationship based on the pose change information corresponding to the i-th station point and the (i−1)-th station point.

20. The storage medium of claim 15, wherein the instructions for obtaining the second pose constraint relationship of the i-th station point relative to the beacons positioned at the i-th station point by the measuring equipment based on the pose of each of the positioned beacons collected at the i-th station point by the measuring equipment and the positions of the beacons positioned at the i-th station comprise:
  instructions for obtaining the second pose constraint relationship of the i-th station point relative to the beacons positioned at the i-th station point by the measuring equipment based on the pose of each of the positioned beacons collected at the i-th station point by the measuring equipment and the measured positions of the beacons whose positions are at positions of the beacons detected at the i-th station point among the beacons have been positioned before determining the position of the i-th station point.

\* \* \* \* \*